(12) United States Patent
Hansson et al.

(10) Patent No.: US 9,574,637 B2
(45) Date of Patent: Feb. 21, 2017

(54) EPICYCLIC GEAR TRAIN

(71) Applicant: Swepart Transmission AB, Liatorp (SE)

(72) Inventors: Hans Hansson, Agunnaryd (SE); Mathias Johansson, Vislanda (SE)

(73) Assignee: SWEPART TRANSMISSION AB (SE)

( * ) Notice: Subject to any disclaimer, the term of this patent is extended or adjusted under 35 U.S.C. 154(b) by 0 days.

(21) Appl. No.: 14/785,296

(22) PCT Filed: Apr. 11, 2014

(86) PCT No.: PCT/EP2014/057345
§ 371 (c)(1),
(2) Date: Oct. 16, 2015

(87) PCT Pub. No.: WO2014/173701
PCT Pub. Date: Oct. 30, 2014

(65) Prior Publication Data
US 2016/0091053 A1 Mar. 31, 2016

(30) Foreign Application Priority Data
Apr. 25, 2013 (EP) ..................... 13165311

(51) Int. Cl.
*F16H 57/08* (2006.01)
*F16H 1/28* (2006.01)
(52) U.S. Cl.
CPC ............. *F16H 1/2863* (2013.01); *F16H 1/28* (2013.01); *F16H 2001/2872* (2013.01)

(58) Field of Classification Search
None
See application file for complete search history.

(56) References Cited

U.S. PATENT DOCUMENTS

| 2,444,734 | A | * | 7/1948 | Gillett | .................. | F16H 1/2863 |
|---|---|---|---|---|---|---|
| | | | | | | 33/199 R |
| 2,501,034 | A | * | 3/1950 | Derbyshire | ........... | F16H 1/2836 |
| | | | | | | 475/346 |
| 3,315,547 | A | * | 4/1967 | Fritsch | .................. | F16H 1/2836 |
| | | | | | | 475/346 |

(Continued)

FOREIGN PATENT DOCUMENTS

| DE | 19510499 A1 | 9/1996 |
|---|---|---|
| DE | 19756967 A1 | 6/1999 |

(Continued)

*Primary Examiner* — Dirk Wright
(74) *Attorney, Agent, or Firm* — Condo Roccia Koptiw LLP

(57) ABSTRACT

The present disclosure relates to an epicyclic gear train comprising a driving pinion (3), driving a plurality of planetary gears (7). Each planetary gear rotates around a planetary axis (23), which has first (9) and a second (11) interconnected gears with different numbers of teeth. The first gear (9) meshes with a first ring gear (19), which is stationary, and the second gear (11) meshes with a second ring gear (25) which is thereby made to rotate about a central axis (21) of the planetary gearing. An adjusting arrangement is arranged to alter the distance between the central axis (21) and each planetary axis (23), such that gearing backlash can be substantially eliminated.

14 Claims, 4 Drawing Sheets

(56) References Cited

U.S. PATENT DOCUMENTS

| | | | | |
|---|---|---|---|---|
| 3,635,103 | A | * | 1/1972 | Monti ...................... F16C 23/10 |
| | | | | 384/255 |
| 4,944,195 | A | * | 7/1990 | Takahashi ............. F16H 1/2863 |
| | | | | 475/12 |
| 5,240,462 | A | * | 8/1993 | Mochizuki ............ F16H 1/2863 |
| | | | | 475/341 |
| 5,910,066 | A | | 6/1999 | Schulz et al. |
| 5,957,804 | A | * | 9/1999 | Schulz .................. F16H 1/2863 |
| | | | | 475/331 |
| 6,290,625 | B1 | | 9/2001 | Shirokoshi |
| 7,377,875 | B2 | * | 5/2008 | Shiina .................... B62D 5/008 |
| | | | | 475/331 |

FOREIGN PATENT DOCUMENTS

| | | |
|---|---|---|
| DE | 19961788 A1 | 6/2000 |
| DE | 19928385 A1 | 12/2000 |
| JP | S62220748 A | 6/1987 |
| JP | S62224755 A | 10/1987 |
| JP | S6313939 A | 1/1988 |

* cited by examiner

SECTION B-B

EPICYCLIC GEAR TRAIN

CROSS REFERENCE TO RELATED APPLICATIONS

This application is the National Stage Entry under 35 U.S.C. 371 of Patent Cooperation Treaty Application No. PCT/EP2014/057345, filed Apr. 11, 2014, which claims the benefit of European Patent Application No. 13165311.5, filed Apr. 25, 2013, the contents of which are hereby incorporated by reference herein.

TECHNICAL FIELD

The present disclosure relates to an epicyclic gear train comprising a driving pinion driving a plurality of planetary gears, each planetary gear rotating around a planetary axis and having a first and a second interconnected gear with different numbers of teeth, the first gear meshing with a first ring gear, which is stationary, and the second gear meshing with a second ring gear which is thereby made to rotate about a central axis of the epicyclic gear train.

BACKGROUND

Such a gear train is known e.g. from U.S. Pat. No. 5,957,804-A, which describes a gear train for an industrial robot. The axial distance between a first and a second ring gear can be adjusted, and the gears of each planetary gear may be conical to allow a floating planetary holder.

One general problem associated with planetary gears is to improve their performance and reliability.

SUMMARY

This object is achieved by means of an epicyclic gear train as defined in claim 1. More specifically, an epicyclic gear train of the initially mentioned kind then includes an adjusting arrangement which is arranged to change the distance between the central axis and each planetary axis. This means that the planetary axes can be moved outwards, from the central axis, until meshing closely with the ring gears, thereby substantially reducing backlash which is useful e.g. when the gear train is used for positioning purposes.

The adjusting arrangement may be accomplished by a centre axis of each planetary gear being offset with regard to a mounting axis at which the planetary gear is attached to the planetary holder, the planetary gear being rotatable about the mounting axis. A central control gear may then be used to control a plurality of (e.g. three) planetary control gears, each being connected to a shaft that suspends a planetary gear between two plates of the planetary holder. The central gear may then be turned to move the planetary axes outwards until backlash is substantially reduced. This need be done only once, at assembly of the gear train.

The driving pinion may be placed at the centre axis of the epicyclic gear train, the driving pinion directly driving the first gears of the planetary gears. Alternatively the driving pinion may be displaced from the centre of the gear train, and arranged to drive a gear that is connected directly to the planetary holder.

The adjusting arrangement may be adapted to adjust distance between the central axis and each planetary axis in an identical manner.

The planet holder may be axially floating and may be kept axially in place by means of at least either of the first and second gears in each planetary gear being conical and interacting with a gear ring having a corresponding conicity.

DETAILED DESCRIPTION

Figure 1:
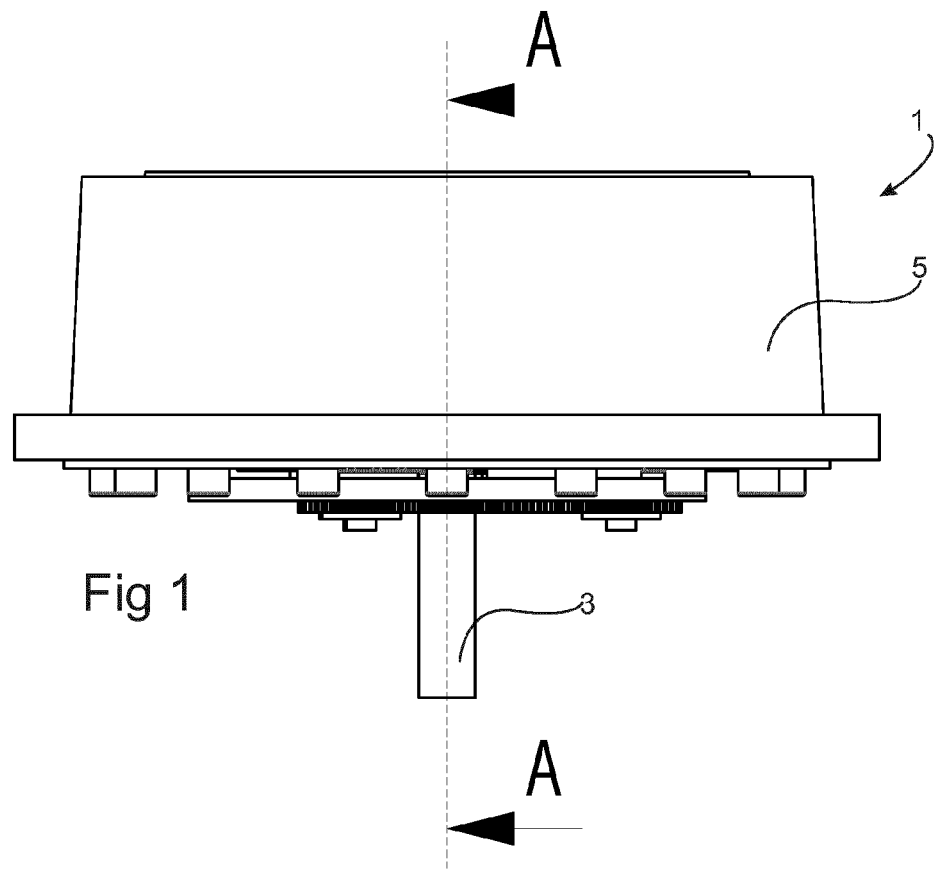
FIG. 1 shows a side view of a planetary gear with a central driving pinion.

The present disclosure relates to a an epicyclic gear train (or planetary gearing) that accomplishes a high overall gear ratio, e.g. higher than 50:1, typically in the range 100:1 to 400:1, and with a compact structure. FIG. 1 shows a side view of such a planetary gear 1 with a central driving pinion 3. The gear 1 has an outer casing 5 that may be attached to a structure to provide a stationary reference point with regard to the operation of the gear train.

Figure 2:
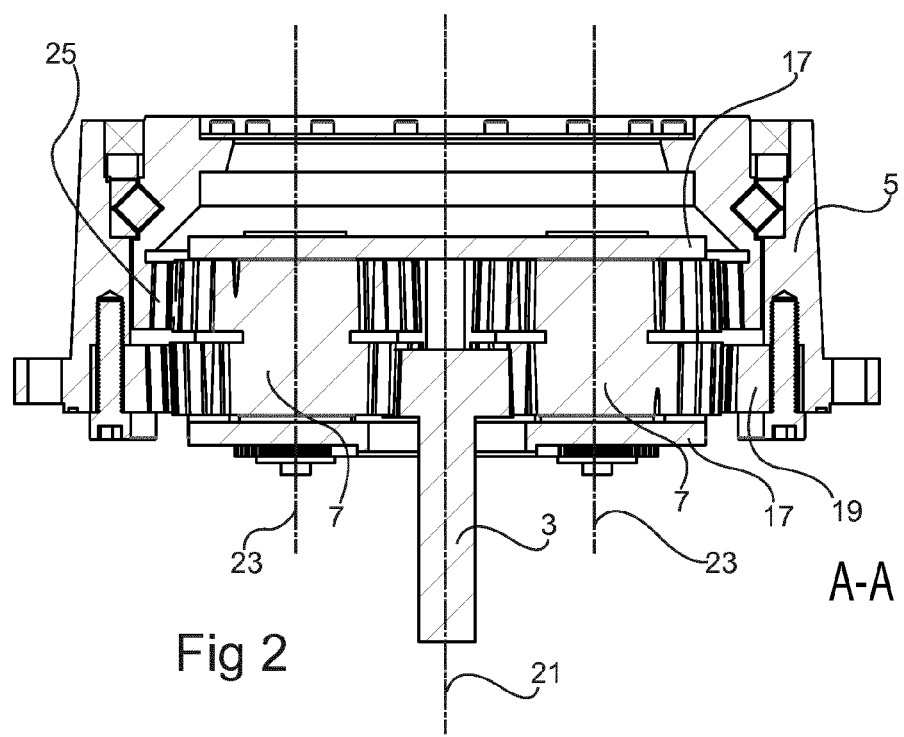
FIG. 2 shows a cross-section along the line A-A in FIG. 1.

FIG. 2 shows a cross-section along the line A-A in FIG. 1. The gear train has three planetary gears 7. Although three planetary gears will be considered preferred in most applications a different number of planetary gears may be conceivable. The planetary gears 7 are more clearly visible in FIG. 4, and each comprise a first 9 and a second 11 gear which are arranged rotatably on a common axis by means of bearings 13, and are mutually connected such that they rotate with the same speed. The first 9 and second 11 gear in each planetary gear 7 may even be deviced in one single piece, but have different sizes in terms of number of teeth.

Figure 3:
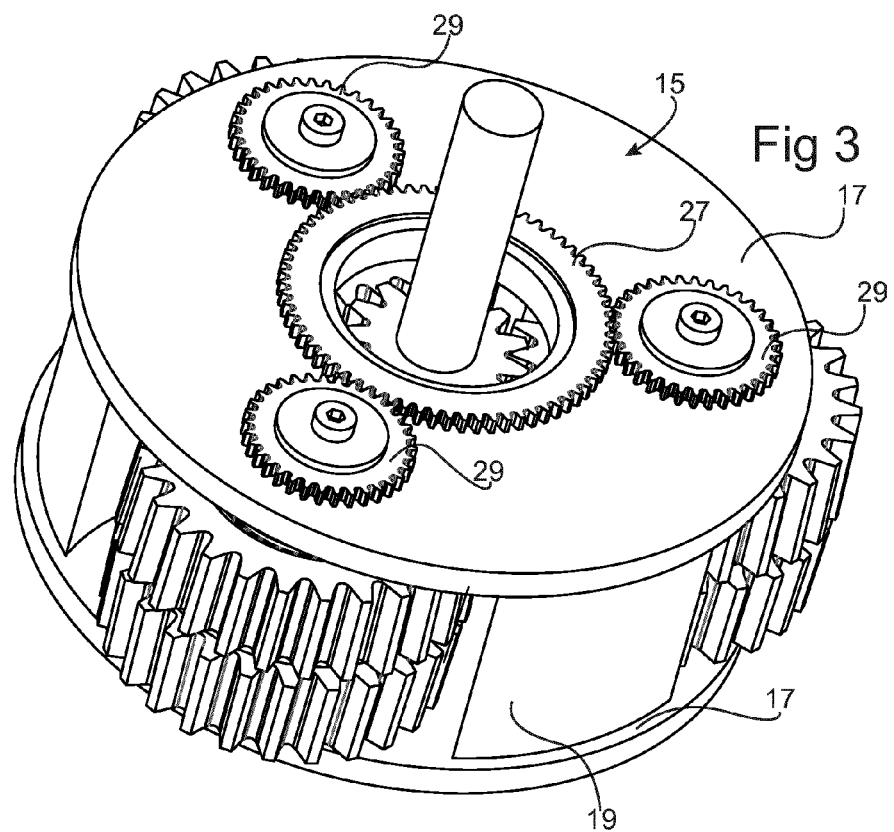
FIG. 3 shows the exposed planet holder of FIG. 2.

The planetary gears 7 are arranged in a common planet holder 15, cf. FIG. 3, which may be formed by two circular plates 17, which are separated by spacers 19 in order to provide a space between the plates that is sufficient to give room for the planetary gears 7 between the plates 17. In the illustrated planet holder, three planetary gears are provided with 120° spacing, although different angular spacings are possible.

Figure 4:
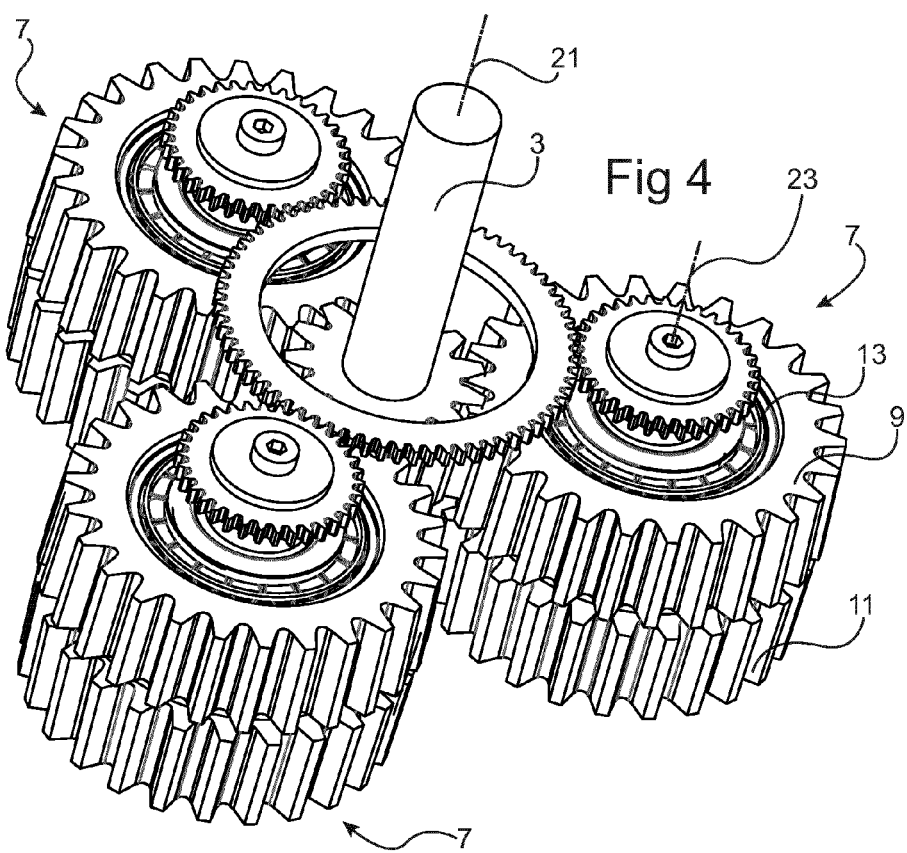
FIG. 4 shows the planet gears of the planet holder in FIG. 3.

As can be seen e.g. in FIG. 4, the centrally located driving pinion 3 meshes with the first gear 9 in each planetary gear 7. Each of the first gears 9 in the planetary gears 7 further meshes, at different locations, with a first outer ring gear 19, cf. FIG. 2, which is stationary by being attached to the outer casing 5. As a result, the rotation of the driving pinion 3, which is aligned with a centre axis 21 of the gear train, makes the axes 23 of the planetary gears 7 circulate around the centre axis 21 while the planetary gears rotate.

Figure 5A:
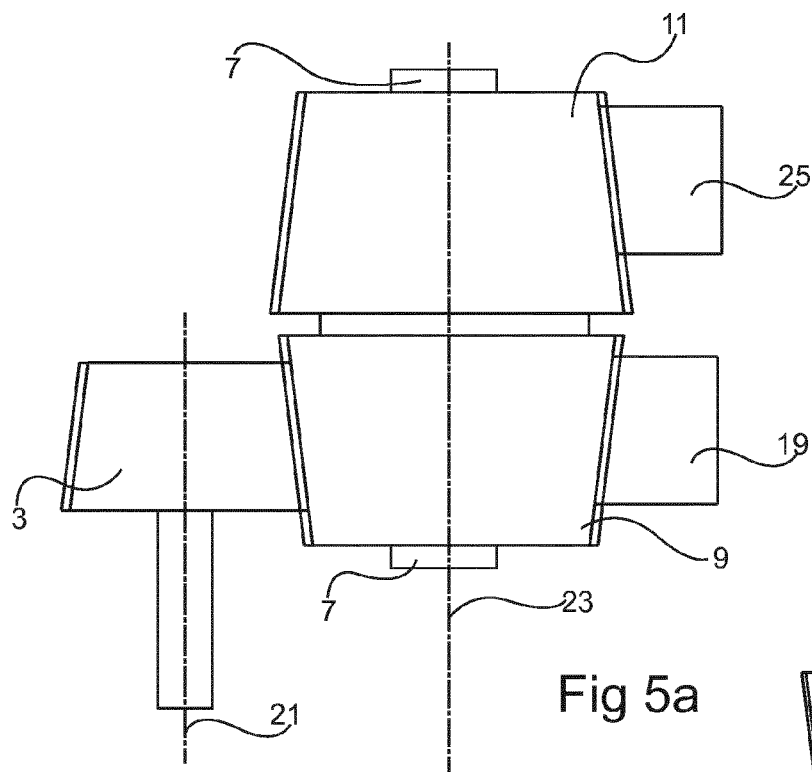
FIG. 5a illustrates schematically the backlash reducing function according to the present disclosure.

The second gear 11 of each planetary gear 7 meshes with a second outer ring gear 25, which is arranged rotatably around the centre axis 21 by means of bearings. As the first 9 and second 11 gear of each planetary gear 7 have mutually different number of teeth, and further the first 19 and second 25 ring gears have mutually different number of teeth, the movement of the planetary gears 7 make the second ring gear 25 move relative to the first ring gear 19 and thus rotate around the centre axis 21. The second gear ring may be connected to an output shaft (not shown). As compared to the angular speed of the driving pinion 3, the angular speed of the second gear ring will be low. The first and second gear rings are here numbered as they appear as seen from the driving pinion's side of the gear train. It is possible to have the upper gear ring 25 (as seen in FIG. 5a) fixed and the lower gear ring 19 connected to a gear train output instead. The shaft of the driving pinion could also extend through the gear train, upwards as illustrated in FIG. 5a, given that sufficient space is available between the planet gears.

Table 1 below provides an example of an epicyclic gear train and its corresponding gear ratio:

| Part | Number of teeth |
| --- | --- |
| Driving pinion (3), connected to input shaft | $Z_1 = 13$ |
| Planetary first gear (9) driven by pinion | $Z_2 = 26$ |
| First ring gear (19), fixed | $Z_3 = 65$ |
| Planetary second gear (11) | $Z_4 = 25$ |
| Second ring gear (25), connected to output shaft | $Z_5 = 64$ |

This example gives a gear ratio of U=256, as determined by the formula:

$$U = \frac{1 + \frac{Z_3}{Z_1}}{1 - \frac{Z_3 Z_4}{Z_2 Z_5}}$$

The present disclosure is related to reducing backlash in epicyclic gear trains. Backlash may be a significant problem, typically in applications where the gear is used to position a device accurately. Such applications include industrial robots and transducers of different kinds, and e.g. solar power systems where a gear can be used to align a solar panel with regard to an optimal normal axis. Other possible applications include for instance wind power systems, etc. The gear train disclosed herewith is primarily intended for industrial robot applications.

FIG. 5a illustrates schematically the arrangement used to substantially eliminate backlash in the gear train. In this arrangement, backlash is eliminated by letting the planet holder 15 float to some extent in the axial direction, and by adjusting the distance between the axes 23 of the panetary gears 7 and the centre axis 21, i.e. the radial position between the drive pinion 3 and the planetary gears 7. The radial positions of the planetary gears 7 are adjusted symmetrically, such that the planetary gear axes 23 all travel along a single cylinder which is coaxial with the centre axis 21 of the gear train. This equalizes the transmission load carried by each planetary gear 7.

The first 9 and the second 11 gear in each planetary gear 7 may be conically inclined as is indicated in FIG. 5a. The conical inclinations in FIG. 5 are much exaggerated in FIG. 5a to explain the concept more clearly. In a real application, as indicated in e.g. FIG. 4, the gears may typically be inclined 0.5-4° (half top-angle of gear cone).

Figure 5B:
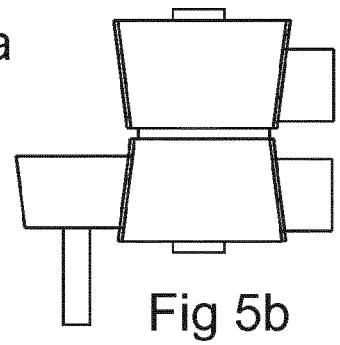
FIG. 5b shows an alternative configuration of conical planet gears.

The first and second gears in each planetary gear may have their widest ends at their mutually closest points. Each ring gear further have an inclination that corresponds to the gear in the planetary gear with which it meshes. This means that the planetary gears and the planet holder are trapped between the ring wheels, and can be floating therein. The same effect is achieved with conical gears that are interconnected at their narrower ends, as indicated in FIG. 5b. It would also be possible to use one cylindrical gear in each planetary gear, but this requires an axial support to the planet holder.

The position of the axis 23 of each planetary gear can be radially adjusted by a mechanism that will be described later. By moving the axis 23 of each planetary gear radially outwards, away from the centre axis 21, one of the first and second gears 9, 11 will come into a close meshing contact with the respective ring gear 19, 25. By moving the axis 23 even further, the axial position of the floating planet carrier 15 may be adjusted as well until also the other of the gears 9, 11 comes into close meshing contact with its respective ring gear 19, 25. For instance, if in FIG. 5a the first gear 9 makes contact with the ring gear 19, the planet holder will then be adjusted upwards in the drawing until also the second gear 11 comes into close meshing contact with the second ring gear 25. At the same time, the position of the driving pinion 3 can be axially adjusted (upwards in the drawing) in order to maintain close meshing contact with the first gear 9 of each planet gear 7. The floating arrangement of the planet holder also takes up some tolerances, for instance the gears of the planetary gears could deviate slightly from a circular shape.

By means of this operation, backlash can be substantially reduced, and this adjustment may be done when the gear train is assembled and may not need to be repeated during the life span of the gear train.

There exists different conceivable ways of adjusting the radial positions of the planetary gears. With reference to FIGS. 6A, 6B and again to FIG. 3, a central control gear 27 is meshing with and is used to control three planetary control gears 29, each being connected to a shaft that suspends a planetary gear 7 between two plates 17 of the planetary holder 15.

Figure 6A:
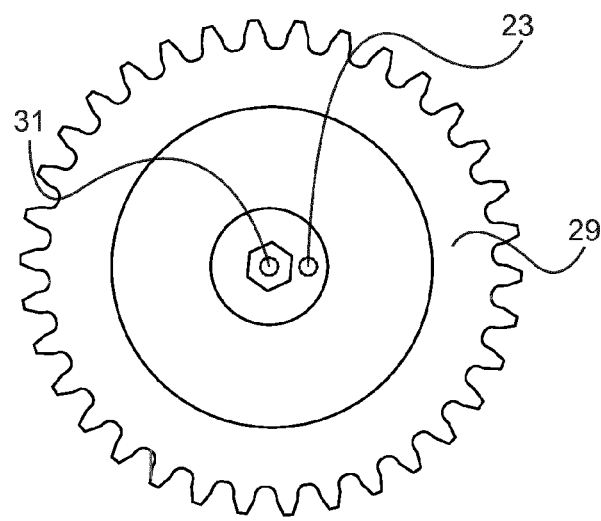
FIG. 6A shows a front view of an adjusting function.
Figure 6B:
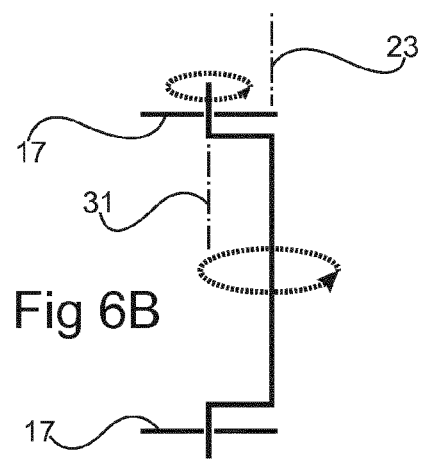
FIG. 6B illustrates schematically the arrangement of axes where a planetary gear is mounted in a gear holder.

The centre axis 23 of the planetary gear 7 is offset with regard to the mounting axis 31 at which the planetary gear is attached to the circular plates 17 of the planetary holder, as is schematically illustrated in FIG. 6B, and resembles a crankshaft. Therefore, when the planetary control gear 29 is rotated, the centre axis 23 of the planetary gear 7 is moved slightly. The offset indicated in FIGS. 6A-6B is exaggerated in FIG. 6 to make the explanation clearer.

Thus, by turning the central control gear 27, it is possible to shift the centre axis of the planetary gear 7 outwards until it reaches the desired position with regard to the ring gears as described in connection with FIG. 5. This operation need only be done once, when the gear train has been assembled. The central control gear 27 may then be locked in the desired position.

It is possible to adjust the axial position of the driving pinion 3 so as to reduce backlash in the driving pinion's connection with the planetary gears 7. However, as this backlash is on the high rotation side of the gear train, its impact on the overall backlash is not very significant. Therefore, in some applications, this operation may be dispensed with.

Figure 7:
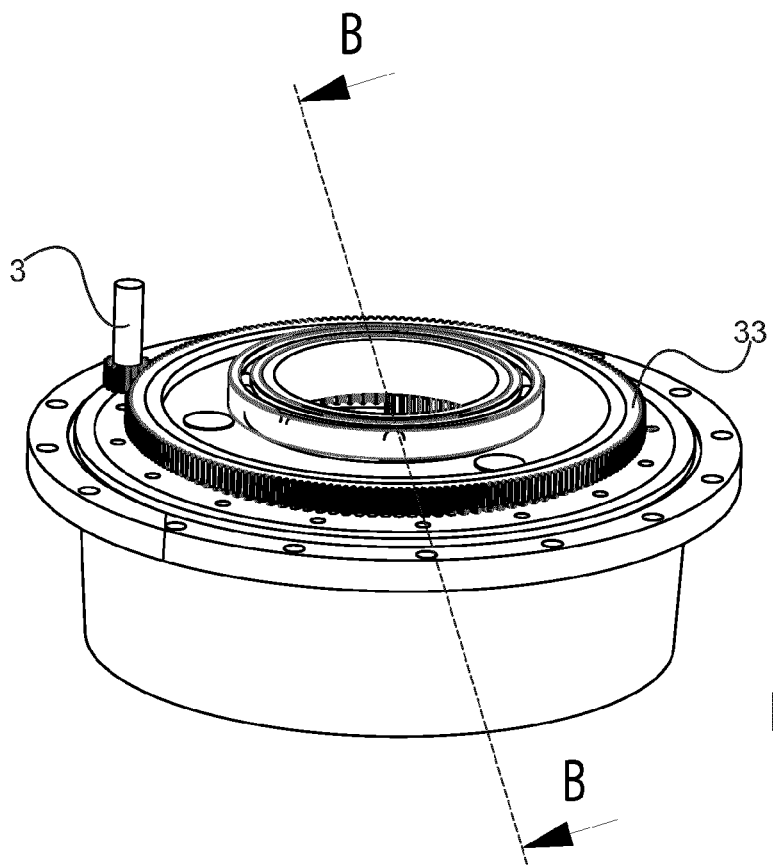
FIGS. 7 and 8 show a perspective view, and a cross-section along a line B-B in the perspective view, of an alternative version of the gear having a hollow shaft.
Figure 8:
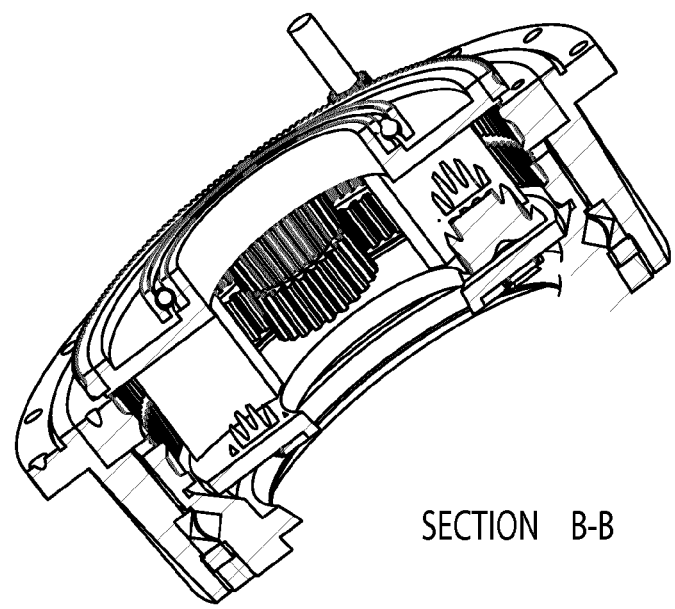

FIGS. 7 and 8 show a perspective view, and a cross-section along a line B-B in the perspective view, of an alternative version of the gear having a hollow centre. In this case, instead of driving the first planetary gears (cf. 9 in FIG. 5), the pinion 3 is displaced from the centre of the gear train, and drives a gear 33 that is connected directly to the planetary holder 15, thereby indirectly driving the planetary gears 7. This, as illustrated in the cross section in FIG. 8, provides an open channel that reaches through the entire gear train. The channel may be useful, e.g. in a robotics implementation, for cable lead-throughs, etc.

The present disclosure is not limited by the illustrated embodiments, and may be varied and altered in different ways within the scope of the appended claims, for instance a pre-gearing could be connected to the pinion that functions as an input to the epicyclic gear train. Further, the adjustment function illustrated in FIGS. 3-4 could be placed on the other side of the planet holder.

The invention claimed is:

1. An epicyclic gear train comprising:
 a driving pinion configured to drive a plurality of planetary gears; and
 the plurality of planetary gears, wherein each planetary gear is attached to a planetary holder, each planetary gear is configure to rotate around a planetary axis, and each planetary gear has first and second interconnected gears with mutually different numbers of teeth, the first gear configured to mesh with a first ring gear that is stationary, the second gear configured to mesh with a second ring gear that is configured to rotate about a central axis of the epicyclic gear train, wherein an adjusting arrangement is configured to alter the distance between the central axis and each planetary axis.

2. An epicyclic gear train according to claim 1, wherein the adjusting arrangement is configured such that a centre axis of the planetary gear is offset with regard to a mounting axis at which the planetary gear is attached to the planetary holder, the planetary gearing being rotatable about the mounting axis.

3. An epicyclic gear train according to claim 2, wherein a central control gear is configured to control a plurality of planetary control gears, each planetary control gear being operably connected to a shaft that suspends a respective planetary gear between two plates of the planetary holder.

4. An epicyclic gear train according to claim 1, wherein the driving pinion is positioned at the centre axis of the planetary gearing, and the driving pinion is configured to directly drive the first gears of the planetary gears.

5. An epicyclic gear train according to claim 1, wherein the driving pinion is displaced from the centre of the gearing, and the driving pinion is configured to drive a gear that is directly connected to the planetary holder.

6. An epicyclic gear train according to claim 1, wherein the adjusting arrangement is configured to adjust distance between the central axis and each planetary axis in an identical manner.

7. An epicyclic gear train according to a claim 1, wherein the planet holder is axially floating and is kept axially in place, wherein at least one of the first or second gears in each planetary gear is conical and configured to interact with a gear ring having a corresponding conicity.

8. An epicyclic gear train comprising:
 a plurality of planetary gears, wherein each planetary gear is operably connected to a planetary holder, each planetary gear is configure to rotate around a planetary axis, and each planetary gear comprises first gears and second gears, wherein the first gears and the second gears of each planetary gears are interconnected have different numbers of teeth, wherein the first gear is configured to interact with a first ring gear, the first gear ring being stationary, the second gear configured to interact with a second ring gear, the second gear ring being configured to rotate; and
 a driving pinion configured to drive the plurality of planetary gears and positioned on a central axis of the epicyclic gear train, wherein an adjusting component is configured to alter the distance between the central axis and each planetary axis of a respective planetary gear.

9. An epicyclic gear train according to claim 8, wherein the adjusting arrangement is configured such that a centre axis of the planetary gear is offset with regard to a mounting axis at which the planetary gear is attached to the planetary holder, the planetary gearing being rotatable about the mounting axis.

10. An epicyclic gear train according to claim 9, wherein a central control gear is configured to control a plurality of planetary control gears, each planetary control gear being operably connected to a shaft that suspends a respective planetary gear between two plates of the planetary holder.

11. An epicyclic gear train according to claim 8, wherein the driving pinion is positioned at the centre axis of the planetary gearing, and the driving pinion is configured to directly drive the first gears of the planetary gears.

12. An epicyclic gear train according to claim 8, wherein the driving pinion is displaced from the centre of the gearing, and the driving pinion is configured to drive a gear that is directly connected to the planetary holder.

13. An epicyclic gear train according to claim 8, wherein the adjusting arrangement is configured to adjust distance between the central axis and each planetary axis in an identical manner.

14. An epicyclic gear train according to a claim 8, wherein the planet holder is axially floating and is kept axially in place, wherein at least one of the first or second gears in each planetary gear is conical and configured to interact with a gear ring having a corresponding conicity.

* * * * *